Figure 2:
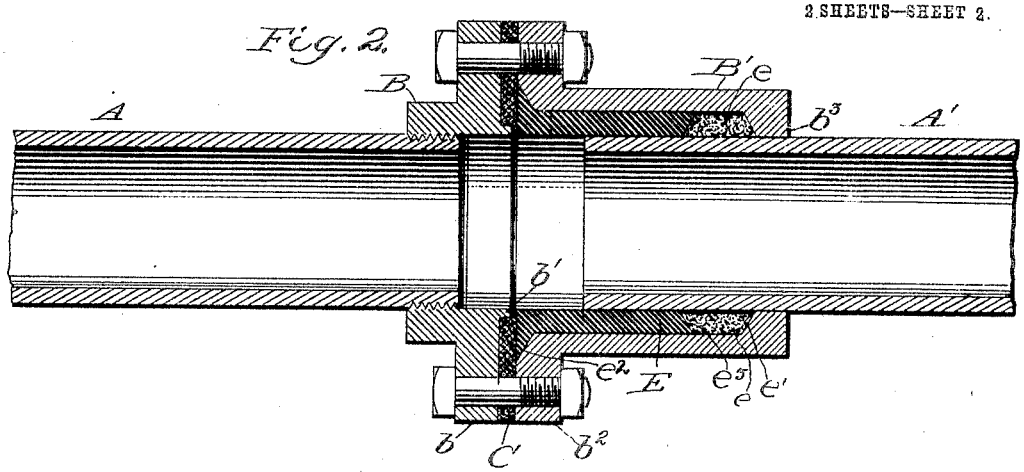

No. 797,152. PATENTED AUG. 15, 1905.
W. R. SHECKLER.
COMBINED UNION, REDUCER, AND EXPANSION JOINT.
APPLICATION FILED APR. 1, 1905.
2 SHEETS—SHEET 1.
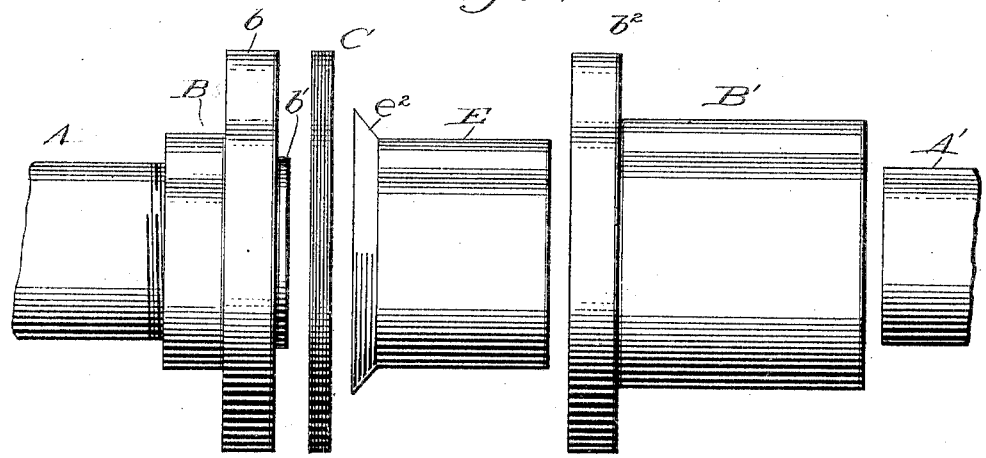
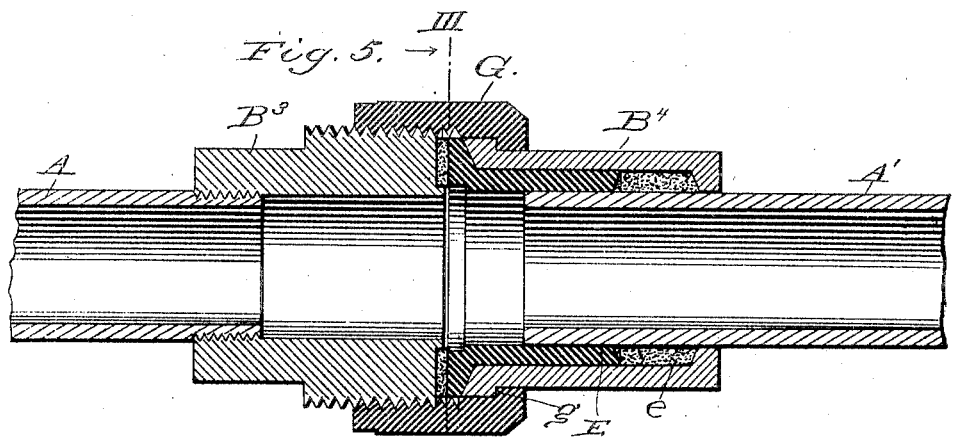
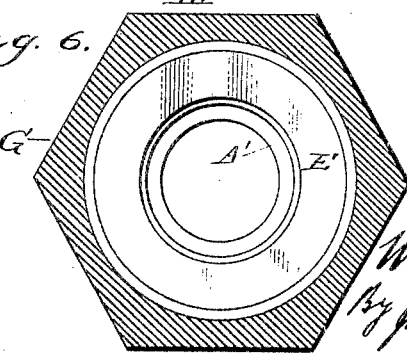

No. 797,152. PATENTED AUG. 15, 1905.
W. R. SHECKLER.
COMBINED UNION, REDUCER, AND EXPANSION JOINT.
APPLICATION FILED APR. 1, 1905.

2 SHEETS—SHEET 2.

Witnesses
Inventor
Wilder R. Sheckler
By Julian C. Bowerton
his Attorneys

UNITED STATES PATENT OFFICE.

WILDER R. SHECKLER, OF GREENVILLE, PENNSYLVANIA.

COMBINED UNION, REDUCER, AND EXPANSION-JOINT.

No. 797,152. Specification of Letters Patent. Patented Aug. 15, 1905.

Application filed April 1, 1905. Serial No. 253,211.

*To all whom it may concern:*

Be it known that I, WILDER R. SHECKLER, a citizen of the United States, residing at Greenville, in the county of Mercer and State of Pennsylvania, have invented certain new and useful Improvements in a Combined Union, Reducer, and Expansion-Joint; and I do hereby declare the following to be a full, clear, and exact description of the invention, such as will enable others skilled in the art to which it appertains to make and use the same.

My invention relates to pipe joints or couplings for connecting sections of pipe used in systems of air, steam, gas, and water distribution, and more particularly to expansion or slip joints for oil-pipe lines and water-mains.

Various devices have heretofore been employed for joining pipe-sections together in such manner that the pipes may not be broken nor the joints injured by the unavoidable expansion and contraction of the metal at different temperatures; but the ever-varying length of the pipe-sections and the greatly increased or reduced length of a given number of rigidly-connected sections, caused by varying degrees of heat and cold, have been hitherto a fruitful source of broken pipes and leaky joints.

One object of my invention is to provide simple, efficient, and inexpensive means whereby adjacent portions of a broken pipe, either with or without threads on the parts to be united, or the threaded or threadless ends of gas or other pipes may be easily and quickly secured together, so as to form an air-tight or water-tight joint which shall not be affected by subsequent expansion or contraction of the metal.

A further object is to provide an improved device of the character referred to adapted to be used on pipes of different sizes for connecting a pipe-section of a given diameter with one of greater or less diameter or two sections of the same diameter, as may be desired.

A further object is to provide an improved expansion pipe-joint with increased capacity for application to different pipe-lines employing pipes of different sizes or different-sized pipes in the same line.

The invention will first be hereinafter more particularly described with reference to the accompanying drawings, which form a part of this specification, and then pointed out in the claims at the end of the description. Said drawings illustrate preferred embodiments of the invention, showing its application to different uses and the utilization of both screw-threads and fastening-bolts for securing the sleeves of the pipe-joints together, either of which class of fastenings may be employed for said sleeves in different forms of the device, and other changes may be made in the details of construction without departing from the spirit and scope of my invention, and hence I do not desire to be limited to the exact construction shown and described.

Figure 3:
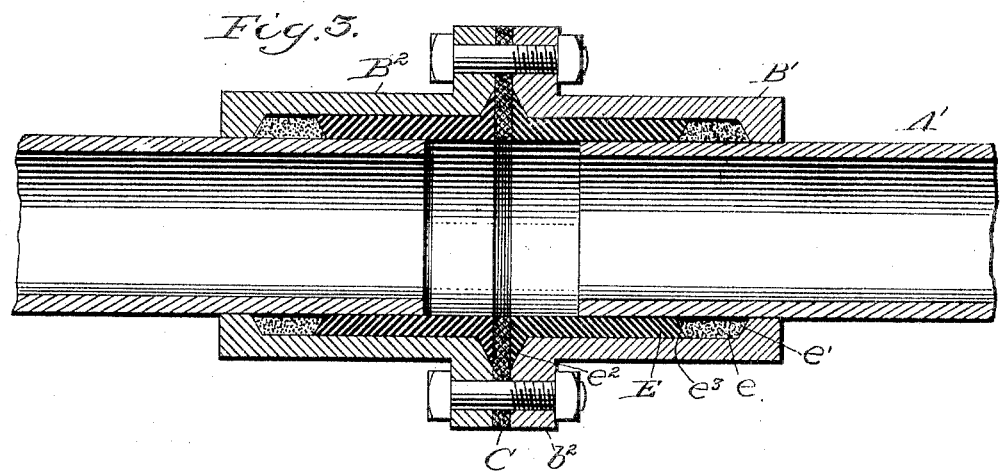
Figure 4:
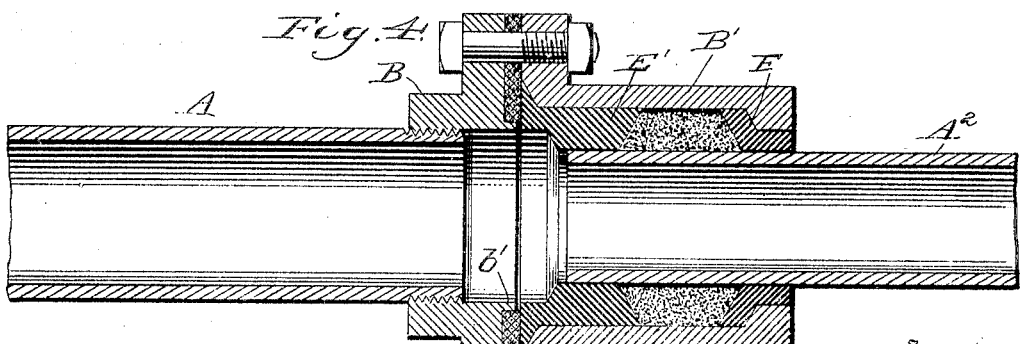

In said drawings, Figure 1 represents a side elevation of the several parts of a pipe-joint embodying my invention disconnected. Fig. 2 is a longitudinal vertical section of the pipe-joint shown in Fig. 1, showing the several parts assembled and connecting a threaded with a threadless section of pipe. Fig. 3 is a similar sectional view showing a slight modification of the invention as applied to connect a broken pipe or threadless sections of pipe. Fig. 4 is a similar sectional view of another modification illustrating the application of the invention to pipes of different diameters. Fig. 5 is a longitudinal sectional view of another modification of the construction shown in Fig. 1, illustrating the use of a nut instead of fastening-bolts for securing the coupling-sleeves together. Fig. 6 is a detail sectional view taken on the line VI VI of Fig. 5 looking in the direction indicated by the arrow.

Referring to the drawings, the letter A denotes a pipe-section having a threaded end, and A' a pipe-section without threads and on which are fitted the coupling pieces or sleeves B and B', respectively, by which the ends of said pipe-sections are joined together. The coupling-piece B has a cylindrical body portion which is interiorly threaded at one end to adapt it to be screwed upon the exteriorly-threaded end of the pipe A, an external circumferential flange $b$ at the other end thereof, and an annular rib or shoulder $b'$ at the base of said flange to provide a retaining-seat for a packing-ring C, which is interposed between the confronting surfaces of the parts B and B'. The coupling-sleeve B' has an external circumferential flange $b^2$ at the end thereof adjacent to the part B and an internal rib or annulus $b^3$ at its opposite end fitting snugly around the pipe A'. The external flanges $b$ $b^2$ have suitably-spaced apertures therein to receive the fastening-bolts for securing said parts together and clamping the packing ring or disk C between them, so as to seal the joint. Within the coupling-sleeve B' is fitted a packing sleeve or gland E, which fits snugly over the end of the pipe A', and in the annular chamber surrounding the pipe between said gland and the annulus or rib $b^3$ is placed suitable packing material $e$, which is compressed around the pipe when the gland is forced inward, so as to form a perfectly air and water tight connection. The packing-sleeve is preferably formed with an inwardly inclined or beveled end $e^3$ and the rib $b^3$ with an outwardly-inclined confronting surface $e'$ for the purpose of crowding the packing toward the pipe. The said packing-sleeve may also be provided with an annular circumferential flange $e^2$, having an outwardly-inclined surface confronting an annular cut-away portion or depression in the adjacent end of the coupling-sleeve, so that when the packing-sleeve is forced home its inner end will be flush with the inner end of the coupling-sleeve and further movement thereof prevented. A thoroughly efficient air and water tight joint is thus formed with provision for expansion and contraction by means of the telescopic connection between the coupling-sleeve B' and pipe-section A'.

In the modification shown in Fig. 3 the coupling-piece B is omitted and instead thereof a coupling-sleeve $B^2$ is employed of the same construction as the coupling-sleeve B' or a counterpart thereof, with similar packing-sleeve therein for uniting the ends of the pipe-sections without threads, thus providing a double expansion-joint.

In Fig. 4 an interchangeable packing sleeve or gland E', of reduced internal diameter, is employed, together with a filling-piece or reducing-ring F, of the same internal diameter, fitting within the sleeve B' and snugly around the pipe $A^2$, which is of lesser diameter than the pipes A and A', thus uniting the ends of two pipes of different sizes by means of the same coupling-sleeves and a packing-sleeve and reducing-ring that may be used interchangeably with packing-sleeves of greater or less internal diameter than the sleeve or gland. It will be understood, of course, that a pair of coupling-sleeves with glands and reducing-rings, such as shown in Fig. 4, may be employed for uniting pipes of different sizes or of reduced size, each without threads, so as to provide the double form of expansion-joint in such cases by the use of the interchangeable glands and reducing-rings with the same coupling-sleeves.

In the modification shown in Figs. 5 and 6 instead of the external circumferential flanges on the coupling-sleeves with fastening-bolts for uniting said parts the coupling-piece $B^3$ is externally threaded and secured to the coupling-piece $B^4$ by a nut G, screwed thereon, having an internal rib $g$ engaging an external rib or projection on the end of the sleeve $B^4$, which is fitted within said nut.

By the described construction a broken pipe with threadless ends can easily be mended by slipping over each of the adjoining ends of the broken parts a coupling-sleeve and inserting therein suitable packing material, then forcing the packing-sleeve into position for compressing the packing, and after placing the packing-disk on its seat drawing the coupling-sleeves together by means of the fastening-bolts, and in the same way pipe-sections either with or without threads may be coupled together and a perfectly tight joint secured. In case one section has a threaded end a threaded coupling-piece may be attached thereto and joined to a coupling-sleeve on the adjoining pipe-section by means of fastening-bolts, such as shown in Figs. 1 to 4 or the nut shown in Fig. 5, and in case either pipe-section is smaller in diameter than the interior diameter of the usual coupling and packing-sleeves it is only necessary to substitute a packing-sleeve of lesser interior diameter and a reducing-ring of like character for making the desired connection.

Having thus described my invention, what I claim as new, and desire to secure by Letters Patent, is—

1. A pipe-joint comprising a tubular body fitted on and firmly secured to one end of a pipe, a coupling-sleeve loosely fitted on the adjacent end of another pipe and having an internal annular abutment for packing confined around the pipe within the sleeve, the inner ends of said tubular body and sleeve adjoining, a packing tube or gland fitting around the pipe within the coupling-sleeve, and means for drawing and fastening said tubular body and coupling-sleeve together spanning and sealing the space between the ends of the connected pipe-sections, substantially as described.

2. A pipe-joint comprising a tubular body fitted on one end of a pipe, a coupling-sleeve fitted on the adjacent end of another pipe and having an internal annular abutment for packing confined around the pipe within the sleeve, the inner ends of said tubular body and sleeve adjoining, a packing tube or gland fitting around the pipe within the coupling-sleeve, a packing-disk between the adjoining ends of said tubular body and coupling-sleeve, and means for drawing and fastening said tubular body and coupling-sleeve together spanning and sealing the space between the ends of the connected pipe-sections, substantially as described.

3. In a pipe-joint, a coupling member consisting of a tubular body or sleeve adapted to be slid over the end of a pipe and having means at one end for attachment to an adjoining coupling member on an adjacent pipe-section and an internal annular rib or shoulder at the other end thereof, and a packing-tube slidably fitted in said tubular body and having an external annular flange at its inner end seated in a corresponding depression in said tubular body, substantially as described.

4. In a pipe-joint, a coupling member consisting of a tubular body or sleeve having means at one end for attachment to an adjoining coupling member and an internal annular rib or shoulder at the other end thereof, and a packing-tube slidably fitted in said tubular body and having an external annular flange at its inner end seated in a corresponding depression in said tubular body, with the inner end of the latter flush with the inner end of said packing-tube, substantially as described.

5. A coupling-sleeve for a pipe-joint having means at one end for attachment to an adjoining coupling member and an annular depression about the opening in said end having an inwardly-inclined wall, and at the other end thereof an internal annular rib or shoulder, combined with a packing-tube fitting within said sleeve and having an external annular flange with an outwardly-inclined wall seated in said depression, substantially as described.

6. A coupling-sleeve for a pipe-joint having means at one end for attachment to an adjoining coupling member and an annular depression about the opening in said end having an inwardly-inclined wall, and at the other end thereof an internal annular rib or shoulder, combined with a packing-tube fitting within said sleeve and having an external annular flange with an outwardly-inclined wall seated in said depression, together with a tubular coupling member adapted for attachment to said coupling-sleeve and having means for securing it to the end of a pipe, substantially as described.

7. A pipe-coupling comprising a pair of sleeves having means for securing their adjacent ends together, each sleeve having an internal annular rib or shoulder at its outer end, packing-tubes fitted in said sleeves having external annular flanges on their adjacent ends, and suitable packing within said sleeves between said packing-tubes and annular ribs or shoulders, substantially as described.

8. A pipe-coupling comprising a pair of sleeves having means for securing their adjacent ends together, each sleeve having an internal annular rib or shoulder at its outer end, packing-tubes fitted in said sleeves having external annular flanges on their adjacent ends, and suitable packing within said sleeves between said packing-tubes and annular ribs or shoulders, together with a flat disk or annulus of packing material fitted between the adjacent ends of said sleeves, substantially as described.

9. In combination with the coupling-sleeve having means at one end for attachment to an adjoining coupling member and an internal annular rib or shoulder at the other end thereof, interchangeable packing-tubes and reducing-rings adapted to be fitted within said sleeve to reduce the size of the opening therethrough to adapt the coupling to a pipe of reduced size, substantially as described.

10. A pipe-joint comprising a tubular body adapted for attachment to the end of a pipe, a coupling-sleeve constructed to fit over an adjoining pipe end and having an internal abutment for packing and means for securing one end thereof to said tubular body, together with interchangeable packing-tubes having different internal diameters adapted to fit interchangeably within said sleeve, and a reducing-ring also fitting within said sleeve, whereby the same tubular body and coupling-sleeve are adapted to secure together pipe ends of the same size or different sizes, substantially as described.

11. A pipe-joint consisting of a tubular body adapted for attachment to a pipe end, in combination with a coupling-sleeve constructed to fit over an adjacent pipe end and confine packing material around the pipe, together with interchangeable packing-tubes having different internal diameters adapted to be inserted interchangeably within one end of said sleeve and a reducing-ring adapted to fit within the other end thereof having its internal diameter corresponding with that of one of said packing-tubes of reduced internal diameter, substantially as described.

12. A pipe-joint comprising a tubular body having means at one end for securing it to a pipe, a sleeve adapted to be slid over an adjoining pipe end having an internal abutment for packing around the pipe, the inner ends of said body and sleeve adjoining, a packing-tube within said sleeve, a packing disk or ring interposed between said adjoining ends, and means for securing the latter together and compressing said packing-disk and packing around the pipes, substantially as described.

In testimony whereof I affix my signature in presence of two witnesses.

WILDER R. SHECKLER.

Witnesses:
SAMUEL J. ORR,
NELLIE SAUL.